(12) United States Patent
Damke et al.

(10) Patent No.: US 11,560,445 B2
(45) Date of Patent: Jan. 24, 2023

(54) SILYLATED POLYURETHANES AND METHODS FOR PREPARING THEREOF

(71) Applicant: Henkel AG & Co. KGaA, Duesseldorf (DE)

(72) Inventors: Jan-Erik Damke, Duesseldorf (DE); Johann Klein, Duesseldorf (DE); Rok Brisar, Rostock (DE); Esteban Mejia, Rostock (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 202 days.

(21) Appl. No.: 16/894,290

(22) Filed: Jun. 5, 2020

(65) Prior Publication Data

US 2020/0299450 A1 Sep. 24, 2020

Related U.S. Application Data

(63) Continuation of application No. PCT/EP2018/083722, filed on Dec. 6, 2018.

(30) Foreign Application Priority Data

Dec. 12, 2017 (EP) .................................... 17206707

(51) Int. Cl.
*C08G 18/28* (2006.01)
*C08G 18/12* (2006.01)
*C08G 18/75* (2006.01)

(52) U.S. Cl.
CPC ........... *C08G 18/289* (2013.01); *C08G 18/12* (2013.01); *C08G 18/755* (2013.01)

(58) Field of Classification Search
CPC .................................................. C08G 18/289
See application file for complete search history.

(56) References Cited

U.S. PATENT DOCUMENTS

| | | | |
|---|---|---|---|
| 5,587,502 A * | 12/1996 | Moren | C07F 7/1804 556/420 |
| 7,365,145 B2 | 4/2008 | Yang et al. | |
| 8,535,798 B2 | 9/2013 | Poivet et al. | |
| 8,609,800 B2 | 12/2013 | Boudet et al. | |
| 9,193,880 B2 | 11/2015 | Allam et al. | |
| 9,765,177 B2 | 9/2017 | Kramer et al. | |
| 9,790,315 B2 | 10/2017 | Kramer et al. | |
| 2014/0242399 A1* | 8/2014 | Nabuurs | C08G 18/289 428/447 |

FOREIGN PATENT DOCUMENTS

| | | |
|---|---|---|
| EP | 0520426 B1 | 4/1996 |
| EP | 2268650 B1 | 11/2012 |
| EP | 2832757 A1 | 2/2015 |
| EP | 2852649 B1 | 8/2017 |
| RU | 2008114381 A | 10/2009 |
| RU | 2455329 C2 | 7/2012 |
| RU | 2501827 C2 | 12/2013 |

OTHER PUBLICATIONS

DIN 55672-1:2007-08.
International Search Report for International PCT Patent Application No. PCT/EP2018/083722 dated Mar. 6, 2019.

* cited by examiner

*Primary Examiner* — Michael L Leonard
(74) *Attorney, Agent, or Firm* — James E. Piotrowski

(57) ABSTRACT

The invention relates to a silylated polyurethane obtainable by reacting:
 d) at least one polyol having a number average molecular weight of from 1000 to 50,000 g/mol;
 e) at least one polyisocyanate, preferably diisocyanate; and
 f) at least one tertiary hydroxyl functional alkoxysilane of the general formula (I)

$$\text{HO}-\underset{R^7}{\overset{R^6}{\vphantom{|}}{|}}-R^5-\overset{O}{\overset{\|}{C}}-\overset{R^1}{\underset{|}{N}}-R^4-\underset{(R^2)_{3-n}}{\overset{(OR^3)_n}{Si}} \quad (I)$$

wherein $R^1$ is selected from the group consisting of hydrogen and a linear or branched, substituted or unsubstituted hydrocarbon residue having 1 to 20 carbon atoms; $R^2$ and $R^3$ are same or different and are, independent from one another, selected from a linear or branched, substituted or unsubstituted hydrocarbon residue having 1 to 20 carbon atoms; $R^4$ is selected from a linear or branched, substituted or unsubstituted hydrocarbon residue having 1 to 20 carbon atoms; $R^5$ is selected from a linear or branched, substituted or unsubstituted hydrocarbon residue having 1 to 20 carbon atoms; $R^6$ and $R^7$ are same or different and are, independent from one another, selected from a linear or branched, substituted or unsubstituted hydrocarbon residue having 1 to 20 carbon atoms; and n is 1, 2 or 3, a method for preparing thereof, a curable composition comprising the thereby obtained silylated polyurethane, and its use.

13 Claims, No Drawings

SILYLATED POLYURETHANES AND METHODS FOR PREPARING THEREOF

The present invention relates to silylated polyurethanes obtainable by reacting at least one polyol, at least one polyisocyanate, and at least one tertiary hydroxyl functional alkoxysilane of the general formula (I) as defined herein and their preparation methods, curable compositions comprising the silylated polyurethane and their use as adhesive, sealant, spray foam and/or coating.

Moisture-curing adhesives and sealants have played a significant role in many technical applications for years. In addition to the polyurethane adhesives and sealants having free isocyanate groups and the traditional silicone adhesives and sealants based on dimethyl polysiloxanes, the use of so-called silane-modified adhesives and sealants has also gained ground in recent times.

In particular, in the presence of atmospheric moisture, polymers having reactive alkoxysilyl groups are capable of condensing with one another even at room temperature, eliminating alcohol molecules. Depending on the content of alkoxysilyl groups and their structure, this causes mainly long-chain polymers (thermoplastics), relatively coarse-meshed three-dimensional networks (elastomers) or highly crosslinked systems (thermosets) to form.

As compared with polyurethane adhesives and sealants, silane-modified adhesives and sealants are distinguished by a broad spectrum of adhesion on a wide range of substrates without surface pretreatment with primers, and they have the advantage of being free from isocyanate groups, in particular monomeric diisocyanates. All isocyanate groups are completely reacted during the prepolymer method to obtain urethane or urea linkages. However, the formation of urethane and urea groups causes a significant increase in prepolymer viscosity due to the strong intermolecular hydrogen bonding. Especially urea linkages can form not only one, but two hydrogen bonds, which has a large contribution to the viscosity increase. Increased viscosity limits the processability of the final product and needs to be avoided in some cases. Due to this reason, urea-free silane-modified prepolymers are of great interest.

Aminoalkoxysilanes are frequently used in adhesive formulations as polymer end-capping agents for moisture curable compositions. The most common end-capping agents are primary amine-functionalized alkoxysilanes, which are extremely reactive towards many electrophiles like for example: isocyanates, aldehydes and anhydrides. This makes them difficult to handle and store. Furthermore, fast and highly exothermic reactions impose processing and safety difficulties in the larger scale production of prepolymers. High reaction rates often result in low reaction selectivity and oligomerization.

EP 2852649 A1, EP 2832757 A1, and EP 2268650 A1 disclose polymers containing silane groups based on hydroxysilanes obtained by reacting aminosilanes with lactides or unsubstituted or monosubstituted lactones which can cause stability issues.

Therefore, a need still exists for silane-modified polymers which overcome at least some of the drawbacks of the known systems.

It has been found that the problems are solved by introducing a tertiary hydroxyl functional alkoxysilane of the general formula (I) which is significantly less nucleophilic and is therefore considerably less reactive, allowing a better reaction control and higher storage stability. In addition, the tertiary hydroxyl functional alkoxysilane of the general formula (I) forms no urea bonds with isocyanate functional compounds, and therefore it can reduce the viscosity of the obtained prepolymers, while keeping or even improving mechanical and adhesive properties. Furthermore, the nucleophilicity of the hydroxyl functionality is very similar to that of the hydroxyl functional polymer, and thus not only a multi-step, but also a single-step prepolymer preparation is possible.

The present invention provides a silylated polyurethane obtainable by reacting:
a) at least one polyol having a number average molecular weight of from 1000 to 50,000 g/mol;
b) at least one polyisocyanate, preferably diisocyanate; and
c) at least one tertiary hydroxyl functional alkoxysilane of the general formula (I)

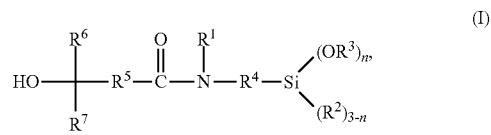

wherein
$R^1$ is selected from the group consisting of hydrogen and a linear or branched, substituted or unsubstituted hydrocarbon residue having 1 to 20 carbon atoms;
$R^2$ and $R^3$ are same or different and are, independent from one another, selected from a linear or branched, substituted or unsubstituted hydrocarbon residue having 1 to 20 carbon atoms;
$R^4$ is selected from a linear or branched, substituted or unsubstituted hydrocarbon residue having 1 to 20 carbon atoms;
$R^5$ is selected from a linear or branched, substituted or unsubstituted hydrocarbon residue having 1 to 20 carbon atoms;
$R^6$ and $R^7$ are same or different and are, independent from one another, selected from a linear or branched, substituted or unsubstituted hydrocarbon residue having 1 to 20 carbon atoms; and
n is 1, 2 or 3.

The term "at least one," as used herein, means 1 or more, i.e., 1, 2, 3, 4, 5, 6, 7, 8, 9, or more. With reference to an ingredient, the indication refers to the type of ingredient and not to the absolute number of molecules. "At least one polymer" thus means, for example, at least one type of polymer, i.e., that one type of polymer or a mixture of several different polymers may be used.

As used herein, the singular forms "a", "an" and "the" include both singular and plural referents unless the context clearly dictates otherwise.

The terms "comprising" and "comprises" as used herein are synonymous with "including", "includes", "containing" or "contains", and are inclusive or open-ended and do not exclude additional, non-recited members, elements or method steps.

The recitation of numerical end points includes all numbers and fractions subsumed within the respective ranges, as well as the recited end points.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

The terms "preferred" and "preferably" are used frequently herein to refer to embodiments of the disclosure that may afford particular benefits, under certain circumstances. However, the recitation of one or more preferable or preferred embodiments does not imply that other embodiments are not useful and is not intended to exclude those other embodiments from the scope of the disclosure.

A "polyol" is understood for purpose of the present invention as a polymer having at least two hydroxyl groups. In principle, many polymers carrying at least two hydroxyl groups, such as polyester polyols, polycaprolactones, polybutadienes or polyisoprenes as well as hydrogenation products thereof, or also polyacrylates or polymethacrylates, can be used as polyol. Mixtures of different polyols can also be used.

According to the present invention, a polyether polyol is preferably used as the polyol. A "polyether" is understood for purpose of the present invention as a polymer whose repeating unit contains ether functionalities C—O—C in the main chain. Polymers having lateral ether groups, such as cellulose ethers, starch ethers, and vinyl ether polymers, as well as polyacetals, are therefore not covered by this definition.

Polymers which contain polyethers as backbone have a flexible and elastic structure with which compositions that have outstanding elastic properties can be manufactured. Polyethers are not only flexible in their backbone, but also strong at the same time. Thus, for example, polyethers (in contrast to e.g., polyesters) are not attacked or decomposed by water and bacteria.

In preferred embodiments of the present invention, the polyol is a polyoxyalkylene, in particular poly(propylene glycol) and poly(ethylene glycol).

Polyethers that have been modified by allyl or vinyl polymers are also suitable for use as a polyol component. Products such as these are obtainable, for example, by polymerizing styrene and/or acrylonitrile, or a mixture thereof, in the presence of polyethers.

The number average molecular weight $M_n$, is understood as the arithmetically averaged molecular weight of the polymer. The number average molecular weight $M_n$, as well as the weight average molecular weight $M_w$, is determined by gel permeation chromatography (GPC, also known as SEC) with tetrahydrofuran (THF) as the eluent according to DIN 55672-1:2007-08, preferably at 35° C. This method is known to one skilled in the art. The polydispersity is derived from the average molecular weights $M_w$ and $M_n$. It is calculated as $PD=M_w/M_n$.

The ratio $M_w/M_n$, also referred to as "polydispersity," indicates the width of the molecular weight distribution and thus the differing degrees of polymerization of the individual chains in polydisperse polymers. For many polymers and polycondensates, the applicable polydispersity value is approximately 2. The best controlled polymerization processes achieve polydispersivity of the final polymer in the range from 1.02 to 1.2. Strict monodispersity would exist for a value of 1. A low polydispersity (for example, less than 1.5) indicates a comparatively narrow molecular weight distribution and thus the specific expression of properties associated with molecular weight, for example viscosity and mechanical strength.

Particularly advantageous viscoelastic properties can be achieved if polyoxyalkylene polymers that possess a narrow molecular weight distribution, and therefore a low polydispersity, are used as polymeric backbones. These can be manufactured, for example, by so-called double metal cyanide catalysis (DMC catalysis). These polyoxyalkylenepolymers are notable for a particularly narrow molecular weight distribution, a high average molecular weight, and a very small number of double bonds at the ends of the polymer chains. Polyoxyalkylene polymers of this kind have a polydispersity PD of at most 1.7.

In preferred embodiments of the present invention, the polyol has a polydispersity (PD) of less than 2, preferably less than 1.5, and more preferably less than 1.3.

Particularly preferred organic backbones are, for example, polyethers having a polydispersity from approximately 1.01 to approximately 1.3, in particular, approximately 1.05 to approximately 1.18, for example approximately 1.08 to approximately 1.11.

In preferred embodiments of the present invention, the polyol has a number average molecular weight ($M_n$) of from 1000 to 50,000 g/mol, preferably from 4000 to 30,000 g/mol, more preferably from 4000 to 25,000 g/mol. Polyether polyol having a number average molecular weight of from 4,000 to 22,000, in particular, of from 4,000 to 20,000 g/mol, are particularly preferred.

In certain embodiments of the present invention, the polyol has a number average molecular weight ($M_n$) of from 10,000 to 20,000 g/mol, particularly preferably from 12,000 to 18,000 g/mol.

Mixtures of multiple polymers having different molecular weights, can also be used according to the present invention instead of pure polymers. In this case, the statements regarding polydispersity and molecular weight, are to be understood in such a way that, advantageously, each of the polymers on which the mixture is based exhibits a polydispersity in the preferred range, but the preferred molecular weight ranges refer to the value averaged over the entire mixture of the polymers that are used.

Commonly used polymers are polyoxymethylene homo- and copolymers, polyurethanes, vinyl butyrates, vinyl polymers, e.g. polymers containing vinyl chloride and/or vinyl acetate, rayon, ethylene copolymers such as e.g. ethylene-vinyl acetate copolymers, ethylene-acrylic acid copolymers, ethylene-acrylate copolymers, organic rubbers, mixtures of different silylated polymers, such that the backbone can also contain silyl groups. Examples include polyethers based on ethylene oxide, propylene oxide, and tetrahydrofuran, polyacrylate, and polymethacrylate. Of the aforesaid polymer backbones, polyethers and polyurethanes are preferred. Polyethers based on polyethylene oxide and/or polypropylene oxide, in particular polypropylene glycol, are preferred. Polymers that contain polyethers as a backbone exhibit a flexible and elastic structure in the polymer backbone. Compositions that exhibit outstanding elastic properties can be manufactured therewith. Polyethers are not only flexible in their framework, but also at the same time strong. For example, they are not attacked or decomposed by water and bacteria and are therefore notable for relative stability (in contrast to polyesters) with respect to environmental influences. The polymer, made up of an organic backbone having carbon atoms in the main chain, contained in the silane-crosslinking adhesive or sealant according to the present invention, does not include inorganic polymers such as, for example, polyphosphates, polysilanes, polysiloxanes, polysulfides. The advantage of the embodiment according to the present invention, in particular of the use of polyurethanes and polyethers, as compared with silicone-based binders or other inorganic polymers, is good adhesion to a very wide variety of substrates, good spreadability, no contamination of the substrate with silicones, and the highly elastic framework structure.

The polyisocyanates suitable for the present invention are preferably diisocyanate or triisocyanate, more preferably diisocyanate. They can be selected from ethylene diisocyanate, 1,4-tetramethylene diisocyanate, 1,4-tetramethoxybutane diisocyanate, 1,6-hexamethylene diisocyanate (HDI), cyclobutane 1,3-diisocyanate, cyclohexane 1,3- and 1,4-diisocyanate, bis (2-isocyanatoethyl) fumarate, as well as mixtures of two or more thereof, 1-isocyanato-3,3,5-trimethyl-5-isocyanatomethylcyclohexane (isophorone diisocyanate, IPDI), 2,4- and 2,6-hexahydrotoluoylene diisocyanate, hexahydro-1,3- or -1,4-phenylene diisocyanate, benzidine diisocyanate, naphthalene 1,5-diisocyanate, 1,6-diisocyanato-2,2,4-trimethylhexane, 1,6-diisocyanato-2,4,4-trimethylhexane, xylylene diisocyanate (XDI), tetramethylxylylene diisocyanate (TMXDI), 1,3- and 1,4-phenylene diisocyanate, 2,4- or 2,6-toluoylene diisocyanate (TDI), 2,4'-diphenylmethane diisocyanate, 2,2'-diphenylmethane diisocyanate, or 4,4'-diphenylmethane diisocyanate (MDI), or partially or completely hydrogenated cycloalkyl derivatives thereof, for example completely hydrogenated MDI (H12-MDI), alkyl-substituted diphenylmethane diisocyanates, for example mono-, di-, tri-, or tetraalkyldiphenylmethane diisocyanate as well as partially or completely hydrogenated cycloalkyl derivatives thereof, 4,4'-diisocyanatophenylperfluorethane, phthalic acid bisisocyanatoethyl ester, 1-chloromethylphenyl-2,4- or -2,6-diisocyanate, 1-bromomethylphenyl-2,4- or -2,6-diisocyanate, 3,3-bis-chloromethyl ether-4,4'-diphenyldiisocyanate, sulfur-containing diisocyanates such as those obtainable by reacting 2 mol diisocyanate with 1 mol thiodiglycol or dihydroxyhexylsulfide, the di- and triisocyanates of the di- and trimer fatty acids, or mixtures of two or more of the aforesaid diisocyanates. It is also possible to use as polyisocyanates trivalent or higher-valence isocyanates such as those obtainable, for example, by oligomerization of diisocyanates, in particular by oligomerization of the aforementioned isocyanates. Examples of such trivalent and higher-valence polyisocyanates are the triisocyanurates of HDI or IPDI or mixtures thereof, or mixed triisocyanurates thereof, as well as polyphenylmethylene polyisocyanate as obtainable by phosgenation of aniline-formaldehyde condensation products.

In the general formula (I)

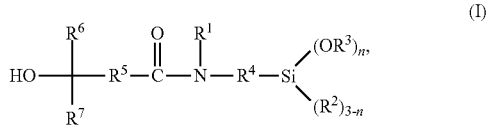

(I)

wherein $R^1$ is selected from the group consisting of hydrogen and a linear or branched, substituted or unsubstituted hydrocarbon residue having 1 to 20 carbon atoms; $R^2$ and $R^3$ are same or different and are, independent from one another, selected from a linear or branched, substituted or unsubstituted hydrocarbon residue having 1 to 20 carbon atoms; $R^4$ is selected from a linear or branched, substituted or unsubstituted hydrocarbon residue having 1 to 20 carbon atoms; $R^5$ is selected from a linear or branched, substituted or unsubstituted hydrocarbon residue having 1 to 20 carbon atoms; $R^6$ and $R^7$ are same or different and are, independent from one another, selected from a linear or branched, substituted or unsubstituted hydrocarbon residue having 1 to 20 carbon atoms; and n is 1, 2 or 3.

$R^1$ in the general formula (I) is selected from the group consisting of hydrogen and a linear or branched, substituted or unsubstituted hydrocarbon residue having 1 to 20 carbon atoms, preferably a $C_1$-$C_{20}$ alkyl or $C_6$-$C_{18}$ aryl residue, which may be interrupted by at least one heteroatom. In preferred embodiments, $R^1$ is hydrogen or selected from a $C_1$-$C_8$ alkyl residue, more preferably a methyl, ethyl or n-propyl residue, most preferably, $R^1$ is hydrogen.

$R^2$ and $R^3$ in the general formula (I) are same or different and are, independent from one another, selected from a linear or branched, substituted or unsubstituted hydrocarbon residue having 1 to 20 carbon atoms, preferably a $C_1$-$C_{20}$ alkyl or $C_6$-$C_{18}$ aryl residue, more preferably a $C_1$-$C_8$ alkyl residue, which may be interrupted by at least one heteroatom. Particularly preferably $R^2$ and $R^3$ in the general formula (I) are same or different and are, independent from one another, selected from a methyl, ethyl, or n-propyl residue, most preferably a methyl residue.

According to an embodiment of the present invention, $R^2$ is selected from a hydrocarbon residue having 1 to 20 carbon atoms, preferably a $C_1$-$C_{20}$ alkyl, wherein one or more carbon atom(s) are substituted with at least one heteroatoms, preferably selected from O or N. Preferably the carbon atom in alpha position to Si is substituted with O or N.

$R^4$ is selected from a linear or branched, substituted or unsubstituted hydrocarbon residue having 1 to 20 carbon atoms, preferably a $C_1$-$C_{20}$ alkylene, more preferably a $C_1$-$C_8$ alkylene residue, which may be interrupted by at least one heteroatom. $R^4$ is particularly preferably selected from a methylene, ethylene, 1,3-propylene, 2-methyl-1,3-propylene, 1,4-butylene, 3-methyl-1,4-butylene, or 3,3-dimethyl-1,4-butylene residue, most preferably 1,3-propylene residue.

$R^5$ is selected from a linear or branched, substituted or unsubstituted hydrocarbon residue having 1 to 20 carbon atoms, preferably a $C_1$-$C_{20}$ alkylene, more preferably a $C_1$-$C_8$ alkylene residue, which may be interrupted by at least one heteroatom. $R^5$ is particularly preferably selected from methylene, ethylene or 1,3-propylene, 2-methyl-1,3-propylene, 1,4-butylene, 3-methyl-1,4-butylene, or 3,3-dimethyl-1,4-butylene residue, most preferably ethylene or 1,3-propylene residue.

$R^6$ and $R^7$ are same or different and are, independent from one another, selected from a linear or branched, substituted or unsubstituted hydrocarbon residue having 1 to 20 carbon atoms, preferably a $C_1$-$C_{20}$ alkyl, alkenyl, or alkynyl, or $C_6$-$C_{18}$ aryl residue, more preferably a $C_1$-$C_8$ alkyl residue, in particularly preferably a methyl, ethyl, or n-hexyl residue, or a $C_1$-$C_8$ alkenyl residue, which may be interrupted by at least one heteroatom.

n is 1, 2 or 3, preferably 2 or 3, more preferably 3.

The term "substituted hydrocarbon residue," as used in this connection, means that one or more carbon atoms and/or hydrogen atom(s) of the hydrocarbon radicals are replaced by heteroatoms or functional groups. Heteroalkyl groups in which one or more carbon atoms are replaced by heteroatoms, particularly selected from O, S, N, and/or Si, are obtained by the replacement of one or more carbon atoms by heteroatoms. Examples of such heteroalkyl groups are, without limitation, methoxymethyl, ethoxyethyl, propoxypropyl, methoxyethyl, isopentoxypropyl, ethylaminoethyl, trimethoxypropylsilyl, etc. Functional groups that can replace the hydrogen atoms are selected particularly from =O, =S, —OH, —SH, —NH$_2$, —NO$_2$, —CN, —F, —Cl, —Br, —I, —OCN, —NCO, $C_{3-8}$ cycloalkyl, $C_{6-14}$ aryl, a 5-10-membered heteroaryl ring, in which 1 to 4 ring atoms independently are nitrogen, oxygen, or sulfur, and a 5-10-membered heteroalicyclic ring, in which 1 to 3 ring atoms are independently nitrogen, oxygen, or sulfur.

As used herein, a "$C_1$-$C_{20}$ alkyl" or "$C_1$-$C_8$ alkyl" residue refers to a monovalent group that contains from 1 to 20 or from 1 to 8 carbons atoms, that is a radical of an alkane and includes linear and branched organic groups. Examples of alkyl residues include, but are not limited to: methyl; ethyl; propyl (or n-propyl); isopropyl; n-butyl; isobutyl; sec-butyl; tert-butyl; n-pentyl; n-hexyl; n-heptyl; and, 2-ethylhexyl. In the present invention, such alkyl residues may be unsubstituted or may be substituted with one or more substituents, such as halo, preferably fluoro or chloro, nitro, cyano, amido, amino, sulfonyl, sulfinyl, sulfanyl, sulfoxy, urea, thiourea, sulfamoyl, sulfamide and hydroxy, and may optionally be interrupted by at least one heteroatom. The halogenated derivatives of the exemplary hydrocarbon residues listed above may, in particular, be mentioned as examples of suitable substituted alkyl residues.

The term "$C_3$-$C_8$ cycloalkyl" residue is understood to mean a saturated, mono- or bicyclic hydrocarbon residue having from 3 to 8 carbon atoms. Examples of cycloalkyl residues include, but are not limited to: cyclopropyl; cyclobutyl; cyclopentyl; cyclohexyl; cycloheptyl; cyclooctyl; and norbornane.

As used herein, a "$C_6$-$C_{18}$ aryl" residue is used alone or as part of a larger moiety—as in "aralkyl residue"—refers to optionally substituted, monocyclic, bicyclic and tricyclic ring systems in which the monocyclic ring system is aromatic or at least one of the rings in a bicyclic or tricyclic ring system is aromatic. The aryl residue may be optionally interrupted by at least one heteroatom. The bicyclic and tricyclic ring systems include benzofused 2-3 membered carbocyclic rings. Exemplary aryl residues include, but are not limited to: phenyl; indenyl; naphthalenyl, tetrahydronaphthyl, tetrahydroindenyl; tetrahydroanthracenyl; and, anthracenyl. A phenyl residue is preferred.

The term "alkenyl", as used herein, refers to an alkenyl residue which comprises at least two carbon atoms and at least one carbon-carbon double bond, e.g., ethenyl, propenyl, butenyl, or pentenyl and structural isomers thereof such as 1- or 2-propenyl, 1-, 2-, or 3-butenyl, etc. Alkenyl residues can be substituted or unsubstituted. If they are substituted, the substituents are as defined above. The alkenyl residue comprises linear or branched hydrocarbon chains.

The term "alkynyl," as used herein, refers to an alkynyl residue which comprises at least two carbon atoms and at least one carbon-carbon triple bond, e.g., ethynyl (acetylene), propynyl, or butynyl, and structural isomers thereof as described above. Alkynyl residues can be substituted or unsubstituted. If they are substituted, the substituents are as defined above.

The term "$C_1$-$C_{20}$ alkylene" or "$C_1$-$C_8$ alkylene" residue refers to a divalent group that contains from 1 to 20 or 1 to 8 carbon atoms, that is a radical of an alkane and includes linear, branched organic or cyclic groups, which groups may be unsubstituted or substituted and may optionally be interrupted by at least one heteroatom. In general, a preference for alkylene groups containing from 1-20 carbon atoms ($C_1$-$C_{20}$ alkylene)—for example substituted, unsubstituted, interrupted or un-interrupted alkylene groups containing from 1 to 8 carbon atoms ($C_1$-$C_8$ alkylene)—should be noted. Where the term "$C_1$-$C_8$ alkylene group" is used to define the component A herein, it is particularly preferred for said alkylene group to be uninterrupted.

Where mentioned, the expression "interrupted by at least one heteroatom" means that the main chain of a residue comprises, as a chain member, at least one atom that differs from carbon atom, preferably oxygen, sulfur, fluorine, nitrogen, or chloride.

In preferred embodiments, the silylated polyurethane according to the present invention has a viscosity of from 2 to 1000 Pa·s, preferably from 2 to 500 Pa·s, more preferably from 5 to 100 Pa·s, measured at 25° C. by Anton Paar MCR 302 Rheometer in neat conditions using PP25/TG stirring plate.

In other preferred embodiments, the silylated polyurethane according to the present invention is a solid form which has a melting point of higher than room temperature.

In preferred embodiments, the tertiary hydroxyl functional alkoxysilane compound of the general formula (I) is obtainable by reacting at least one di-substituted lactone compound and at least one aminosilane having at least one primary or secondary amino group.

In preferred embodiments, the di-substituted lactone has the general formula (II)

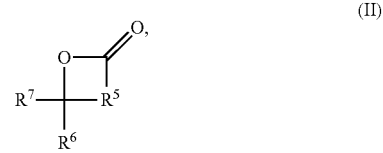

(II)

wherein $R^5$, $R^6$ and $R^7$ are the same as defined for the general formula (I) above.

In preferred embodiments, the aminoalkoxysilane used in preparing tertiary hydroxyl functional alkoxysilane of the general formula (I) is an aminoalkylenealkoxysilane having the general formula (III)

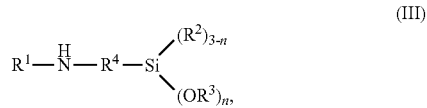

(III)

wherein $R^1$ to $R^4$ and n are the same as defined for the general formula (I) above.

Preferably, the aminoalkylenealkoxysilane is selected from the group consisting of gamma-aminopropyltrimethoxysilane, gamma-aminopropyltriethoxysilane, gamma-aminopropylmethyldiethoxysilane, gamma-aminopropylmethyldimethoxysilane, gamma-aminopropyltriisopropoxysilane, gamma-aminopropylmethyldiisopropoxysilane, alpha-aminomethyltriethoxysilane, alpha-aminomethyltrimethoxysilane, alpha-aminomethyldiethoxymethylsilane, alpha-aminomethyldimethoxymethylsilane, alpha-aminomethyltriisopropoxysilane, alpha-aminomethyldiisopropoxymethylsilane gamma-aminopropylsilanetriol, gamma-aminopropylmethylsilanediol, gamma-(2-aminoethyl)aminopropylsilanetriol, gamma-(2-aminoethyl)aminopropyltrimethoxysilane, gamma-(2-aminoethyl)aminopropylmethyldimethoxysilane, gamma-(2aminoethyl)aminopropyltriethoxysilane, gamma-(2-aminoethyl)aminopropylmethyldiethoxysilane, gamma-(2-aminoethyl)aminopropyltriisopropoxysilane, gamma-(6-aminohexyl)aminopropyltrimethoxysilane, gamma-(6-aminohexyl)aminopropyltrimethoxysilane, gamma-(2-aminoethyl)aminopropyltriisopropoxy, gamma-(2-aminoethyl)aminopropylmethyldiisopropoxy, gamma-(N-ethylamino)-2-methylpropyltrimethoxysilane, N-phenyl-gamma-aminopropylmethyldimethoxysilane, N-benzyl-gamma-aminopropyltrimethoxysilane, N-benzyl-gamma-aminopropyltriethoxysilane, N-benzyl-gamma-aminopropylmethyldimethoxysilane, N-vinylbenzyl-gamma-aminopropyltriethoxysilane, N-methyl-gamma-aminopropyltriethoxysilane, N-methyl-gamma-aminopropylmethyldimethoxysilane, N-methyl-gamma-aminopropyltrimethoxysilane, N-ethyl-gamma-aminopropyltriethoxysilane, N-ethyl-gamma-aminopropylmethyldimethoxysilane, N-ethyl-gamma-aminopropyltrimethoxysilane, N-propyl-gamma-aminopropyltriethoxysilane, N-propyl-gamma-aminopropylmethyldimethoxysilane, N-propyl-gamma-aminopropyltrimethoxysilane, N-butyl-gamma-aminopropyltriethoxysilane, N-butyl-gamma-aminopropylmethyldimethoxysilane, N-butyl-gamma-aminopropyltrimethoxysilane, N-cyclohexylaminomethyltriethoxysilane, N-cyclohexylaminomethyltriethoxysilane, N-cyclohexylaminomethyltrimethoxysilane, N-cyclohexylaminomethylmethyldiethoxysilane, N-cyclohexylaminomethyldiethoxymethylsilane, N-phenylaminomethyltrimethoxysilane, (2-aminoethyl)aminomethyltrimethoxysilane, N,N'-bis[3-(trimethoxysilyl)propyl]ethylenediamine, delta-aminoneohexyltrimethoxysilane, N-beta-(aminoethyl)-gamma-aminopropylmethyldimethoxysilane and deltaaminoneohexylmethyldimethoxysilane, or mixtures thereof.

Synthesis of hydroxyl functional silane having the general formula (I) can be conducted at a broad range of temperatures, e.g., from −50 to 200° C., preferably−10 to 180° C., more preferably 23 to 100° C., most preferably 30 to 60° C. The reaction is performed preferably under argon or nitrogen atmosphere.

In preferred embodiments, the molar ratio of the di-substituted lactone compound reaction and the aminosilane is from 0.8 to 1.3, more preferably from 1 to 1.2. If the lactone compound is added in excess, the unreacted lactone compounds are removed after the reaction using a vacuum or remain in the final product as a mixture.

The reaction can be carried out in the presence of a catalyst to increase the reaction rates. The catalyst can be selected from a Lewis acid, preferably metal-containing compounds and derivatives of Main group elements, more preferably an organoaluminium compound, such as triethylaluminium.

The catalyst can be added from 0.001 to 5 mol %, preferably from 0.01 to 3 mol %, more preferably from 0.5 to 2 mol %, relative to the mol % of the amine functionality of the aminoalkoxysilane.

The reaction can be conducted with or without a solvent. Preferable solvents are water-free polar solvents like toluene, acetonitrile, tetrahydrofuran, ethylene glycol, dimethyl ether, diethyl ether, benzene, ethyl acetate, propylene carbonate, ethylene carbonate, isopropanol, butanol, ethylene glycol, n-propanol, ethanol, methanol, chloroform, chloromethane, preferably in dichloromethane. Before the product is used, for example, for preparation of curable compositions, it is preferable to remove the solvent by distillation.

Reaction time can vary from 0.5 to 12 hours, preferably from 1 to 5 hours, more preferably from 1 to 3 hours.

According to an embodiment of the present invention, at least one compound that is monofunctional to isocyanates, preferably selected from the group consisting of monoalcohols, monomercaptans, monoamines, and mixtures thereof, and/or at least one monoisocyanate can be optionally added in the preparation of the silylated polyurethane.

All monofunctional alcohols, amines, or mercaptans are suitable as the compound that is monofunctional to isocyanates; these are, in particular, monofunctional alcohols having up to 36 carbon atoms, monofunctional primary and/or secondary amines having up to 36 carbon atoms, or monofunctional mercaptans having up to 36 carbon atoms. Mixtures of polyalcohols, polyamines, and/or polymercaptans can also be used as monofunctional compounds, provided their average functionality is well below 2.

Particularly preferred, for example, are monoalcohols such as benzyl alcohol, methanol, ethanol, the isomers of propanol, of butanol, and of hexanol, monoethers of ethylene glycol and/or diethylene glycol, and the primary alcohols having 8 to 18 carbon atoms obtainable by reduction of fatty acids, such as octanol, decanol, dodecanol, tetradecanol, hexadecanol, and octadecanol, especially in the form of technical mixtures thereof. Monoalcohols having 4 to 18 carbon atoms are preferred, since the lower alcohols are difficult to manufacture in anhydrous fashion.

Also usable are monoalkylpolyether alcohols of various molecular weights, a number average molecular weight of between 1000 and 2000 being preferred. A preferred representative is, for example, monobutylpropylene glycol.

Saturated fatty alcohols having up to 26 carbon atoms can also be used, preferably those having up to 22 carbon atoms that can be synthesized on an industrial scale by reduction (hydrogenation) of fatty acid methyl esters. Examples that may be recited are: hexanol, octanol, pelargonic alcohol, decanol, lauric alcohol, myristic alcohol, cetyl alcohol, stearyl alcohol, gadoleyl alcohol, and behenyl alcohol, or the Guerbet alcohols 2-hexyldecanol, 2-octyldodecanol, 2-decyltetradecanol, 2-dodecylhexadecanol, 2-tetradecyloctadecanol, 2-hexadecyleicosanol, Guerbet alcohol from erucyl alcohol, behenyl alcohol, and ocenols. If applicable, mixtures resulting from Guerbetization of technical fatty alcohols can be used together with the other aforesaid alcohols.

The proportion of the compound that is monofunctional to isocyanates is 0 to 40 mol %, preferably 1 to 40 mol %, more preferably 15 to 30 mol %, based on the sum of the polyol compound(s) and the monofunctional compound(s).

Suitable monoisocyanates include, without limitation, butyl isocyanate, hexyl isocyanate, octyl isocyanate, 2-ethylhexyl isocyanate, stearyl isocyanate, cyclohexyl isocyanate, phenyl isocyanate, and benzyl isocyanate.

The proportion of the monoisocyanate is 0 to 40 mol %, preferably 1 to 40 mol %, more preferably 15 to 30 mol %, based on the sum of the polyisocyanate(s) and the monoisocyanate(s).

In another aspect, the present invention provides a method for preparing a silylated polyurethane by reacting:
  a) at least one polyol having a number average molecular weight of from 1000 to 50,000 g/mol;
  b) at least one polyisocyanate, preferably diisocyanate; and
  c) at least one tertiary hydroxyl functional alkoxysilane of the general formula (I) as defined herein

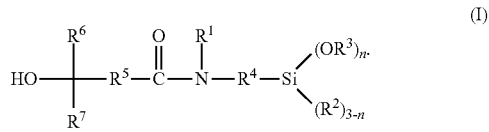

The preparation process can be conducted in various ways including the Methods 1 to 4 as follows.

Method 1: In preferred embodiments of the present invention, the silylated polyurethane is obtainable by
(a) reacting at least one polyol having a number average molecular weight of from 1000 to 50,000 g/mol with at least one polyisocyanate, preferably diisocyanate, with a stoichiometric excess of the NCO group of the polyisocyanate(s) with respect to the OH group of the polyol(s) to form a NCO-terminated polyurethane prepolymer; and
(b) reacting said NCO-terminated polyurethane prepolymer with at least one tertiary hydroxyl functional alkoxysilane of the general formula (I) as defined herein

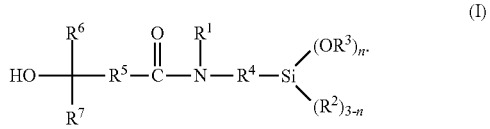

According to the above-described preferred embodiments of the present invention, a stoichiometric excess of the NCO group of the polyisocyanate(s) with respect to the OH group of the polyol(s) used is preferably equal to 1.01 to 2.0, more preferably 1.05 to 1.5. This ensures that NCO-terminated polyurethane prepolymers are formed as a reaction product.

The obtained NCO-terminated polyurethane prepolymer in the first step is then reacted with at least one tertiary hydroxyl functional alkoxysilane of the general formula (I) as defined herein to obtain the silylated polyurethane according to the present invention, which preferably comprises alkoxysilyl groups as reactive end groups. This requires that at least one molecule of the tertiary hydroxyl functional alkoxysilane of the general formula (I) be used for each isocyanate group of the polyurethane prepolymer. Preferably, the tertiary hydroxyl functional alkoxysilane of the general formula (I) is used at a slight stoichiometric excess.

The above-described embodiments can be performed under the following conditions. In the first step at least one polyol and at least one isocyanate functional compound (polyisocyanate) are mixed together for 0.5 to 5 hours at temperature from −10 to 150° C., preferably from 25 to 100° C. In the second step at least one tertiary hydroxyl functional alkoxysilane of the general formula (I) is added as endcapper. Suitable reaction temperature is in a range between −10 and 150° C., preferably between 25 and 100° C., more preferably between 60 and 90° C. Reaction time largely depends on the selected isocyanate functional compound, endcapper and catalyst employed and is in range from 0.5 to 24 hours, preferably from 1 to 3 hours.

Method 2: In alternative embodiments of the present invention, the silylated polyurethane is obtainable by
(a) mixing at least one polyol having a number average molecular weight of from 1000 to 50,000 g/mol and at least one tertiary hydroxyl functional alkoxysilane of the general formula (I) as defined herein

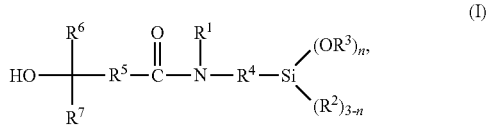

with a stoichiometric excess of the OH group of the tertiary hydroxyl functional alkoxysilane(s) of the general formula (I) with respect to the OH group of the polyol(s); and
(b) reacting the mixture obtained in step (a) with at least one polyisocyanate, preferably diisocyanate, with a stoichiometric excess of the NCO group of the polyisocyanate(s) with respect to the OH group of the polyol(s) and the tertiary hydroxyl functional alkoxysilane(s) of the general formula (I).

According to the above-described alternative embodiments of the present invention, a stoichiometric excess of the OH group of the tertiary hydroxyl functional alkoxysilane(s) of the general formula (I) with respect to the OH group of the polyol(s) is preferably equal to 1.01 to 2.0, more preferably 1.05 to 1.5. A stoichiometric excess of the NCO group of the polyisocyanate(s) with respect to the OH group of the polyol(s) and the tertiary hydroxyl functional alkoxysilane(s) of the general formula (I) used is preferably equal 1.01 to 2.0, more preferably 1.05 to 1.5.

The above-described alternative embodiments can be performed under the following conditions. In the first step, at least one polyol and at least one hydroxyl functional alkoxysilane of the general formula (I) are mixed together for 0.5 to 5 hours at temperature from −10 to 150° C., preferably from 25 to 100° C. The mixture is kept at temperature from −10 to 150° C., preferably from 25 to 100° C. In the second step at least one isocyanate functional compound (polyisocyanate) is added. Suitable reaction temperature is in a range between −10 and 150° C., preferably between 25 and 100° C., more preferably between 60 and 90° C. Reaction time largely depends on the selected isocyanate functional compound, end-capper and catalyst employed and is in range from 0.5 to 24 hours, preferably from 1 to 5 hours.

Method 3: In alternative embodiments of the present invention, the silylated polyurethane is obtainable by
(a) reacting at least one polyisocyanate, preferably diisocyanate, with at least one tertiary hydroxyl functional alkoxysilane of the general formula (I) as defined herein

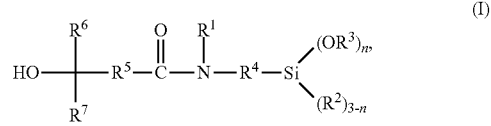

with a stoichiometric excess of the NCO group of the polyisocyanate(s) with respect to the OH group of the tertiary hydroxyl functional alkoxysilane(s) of the general formula (I) to form an isocyanatosilane; and
(b) reacting the isocyanatosilane obtained in step (a) with at least one polyol having a number average molecular weight of from 1000 to 50,000 g/mol.

According to the above-described alternative embodiments of the present invention, a stoichiometric excess of the NCO group of the polyisocyanate(s) with respect to the OH group of the tertiary hydroxyl functional alkoxysilane(s) of the general formula (I) used is preferably equal to 1.01 to 2.0, more preferably 1.05 to 1.5.

The above-described alternative embodiments can be performed under the following conditions. In the first step, at least one silane compound of the general formula (I) and at least one isocyanate functional compound (polyisocyanate) are mixed together for 0.1 to 5 hours at temperature from −10 to 150° C., preferably from 0 to 80° C. In the second step at least one polyol is added to the NCO-terminated endcapper, isocyanatosilane. Suitable reaction temperature is in a range between −10 and 150° C., preferably between 25 and 100° C., more preferably between 60 and 90° C. Reaction time largely depends on the selected isocyanate functional compound, end-capper and catalyst employed and is in range from 1 to 72 hours, preferably from 6 to 12 hours.

Method 4: Alternatively, the silylated polyurethane according to the present invention is obtainable by one-pot synthesis by blending at least one polyol having a number average molecular weight of from 1000 to 50,000 g/mol, at least one polyisocyanate, preferably diisocyanate, and at least one tertiary hydroxyl functional alkoxysilane of the general formula (I) as described herein.

The above-described at least one compound that is monofunctional to isocyanates and/or at least one monoisocyanate can be optionally added in the preparation of the silylated polyurethane. In such a case, a stoichiometric excess of the NCO groups of the polyisocyanate(s) and monoisocyanate(s) with respect to the OH groups of the sum of the polyol compounds and monofunctional compounds used, is equal to 1.01 to 2.0, preferably 1.05 to 1.5. They can be during the preparation process described herein or after the process has been performed, for example in order to react with remaining OH or isocyanate.

The above-described reactions are usually preformed without using a solvent. However, in cases of high viscosity of the reaction mixture, solvents can be used. Useful solvents are acetone, butanone, ethyl acetate, toluene, acetonitrile, tetrahydrofuran and ethylene glycol dimethyl ether, hexane, heptane, pentane, cyclohexane and benzene.

In certain embodiments according to the present invention, aforementioned methods for preparing a silylated polyurethane further comprises a step of adding at least one catalyst. In principle, any compound that can catalyze reaction of a hydroxyl group and an isocyanate group to form a urethane bond can be used.

Suitable catalysts are organometallic Lewis acids like iron or tin compounds, in particular the 1,3-dicarbonyl compounds of iron or of di- or tetravalent tin, tin(II) carboxylates or dialkyltin(IV) dicarboxylates, or the corresponding dialkoxylates, e.g., dibutyltin dilaurate (DBTL), dibutyltin diacetate, dibutyltin diethylhexanoate, dibutyltin dioctoate, dibutyltin dimethylmaleate, dibutyltin diethylmaleate, dibutyltin dibutylmaleate, dibutyltin diiosooctylmaleate, dibutyltin ditridecylmaleate, dibutyltin dibenzylmaleate, dibutyltin maleate, dibutyltin diacetate, tin (II) octaoate, tin(II) phenolate, dioctyltin distearate, dioctyltin dilaurate (DOTL), dioctyltin dimethylmaleate, dioctyltin diethylmaleate, dioctyltin dibutylmaleate, dioctyltin diisooctylmaleate, dioctyltin diacetate, and tin naphthenoate; tin alkoxides such as dibutyltin dimethoxide, dibutyltin diphenoxide, and dibutyltin diisoproxide; tin oxides such as dibutyltin oxide and dioctyltin oxide, reaction products between dibutyltin oxides and phthalic acid esters, or the acetylacetonates of di- or tetravalent tin.

It is also possible to use alkyl titanates, such as tetrabutyl titanate and tetrapropyl titanate, organoaluminum compounds such as aluminum trisacetylacetonate, aluminum trisethylacetoacetate, and diisopropoxyaluminum ethylacetoacetate, chelate compounds such as zirconium tetraacetylacetonate and titanium tetraacetylacetonate, lead octanoate, organosilicon titanium compounds, or bismuth tris-2-ethyl-hexanoate, acid compounds such as phosphoric acid, p-toluenesulfonic acid, or phthalic acid, aliphatic amines such as butylamine, hexylamine, octylamine, decylamine, or laurylamine, aliphatic diamines such as, ethylenediamine, hexyldiamine, or also aliphatic polyamines such as diethylenetriamine, triethylenetetramine, tetraethylenepentamine, heterocyclic nitrogen compounds, e.g. piperidine, piperazine, aromatic amines such as m-phenylenediamine, ethanolamine, triethylamine, and so one.

Also suitable are the following tin compounds: di(n-butyl)tin(IV) sulfide, di(n-butyl)tin(IV) oxide, di(n-octyl)tin(IV) oxide, (n-butyl)$_2$Sn(SCH$_2$COO), (n-octyl)$_2$Sn(SCH$_2$COO), (n-octyl)$_2$Sn(SCH$_2$CH$_2$COO), (n-octyl)$_2$Sn(SCH$_2$CH$_2$COOCH$_2$CH$_2$OCOCH$_2$S), (n-butyl)$_2$Sn(SCH$_2$COO-i-C$_8$H$_{17}$)$_2$, (n-octyl)$_2$Sn(SCH$_2$COO-i-C$_8$H$_{17}$)$_2$, (n-octyl)$_2$Sn(SCH$_2$COO-n-C$_8$H$_{17}$)$_2$.

Chelate-forming tin organyls can also be used, for example di(n-butyl)tin(IV) di(acetylacetonate), di(n-octyl)tin(IV) di(acetylacetonate), (n-octyl)(n-butyl)tin(IV) di(acetylacetonate).

Tin-free catalysts are also particularly preferred. Boron halides, such as boron trifluoride, boron trichloride, boron tribromide, boron triiodide, or mixed boron halides, can thus furthermore be used as curing catalysts. Boron trifluoride complexes such as, for example boron trifluoride diethyl etherate (CAS no. [109-63-71]), which, as liquids, are easier to handle than the gaseous boron halides, are particularly preferred.

In addition to other catalysts also Lewis bases can be used like: trimethylamine, triethylamine, triphenylborane, triphenylphosphine, 1,8-diazabicycloundec-7-ene (DBU), 1,5-diazabicyclo[4.3.0]non-5-ene, 1,4-diazabicyclo[2.2.2]octane, 4-dimethylaminopyridine, 1,5,7-triazabicyclo[4.4.0]dec-5-ene, 7-methyl-1,5,7-triazabicyclo[4.4.0]dec-5-ene, 1,8-bis(tetramethylguanidino)naphthalene, 2-tert-butyl-1,1,3,3-tetramethylguanidine, phosphazene base P$_4$-t-Bu, phosphazene base P$_1$-t-Bu-tris(tetramethylene), phosphazene base P$_2$-Et, phosphazene base P$_2$-t-Bu, phosphazene base P$_4$-t-Oct, phosphazene base P$_1$-t-Oct, imino-tris(dimethylamino)phosphorane, 2-tert-butylimino-2-diethylamino-1,3-dimethylperhydro-1,3,2-diazaphosphorine. Preferable catalysts are DBU and triethylamine.

In yet another aspect, the present invention provides a curable composition comprising at least one silylated polyurethane according to the present invention or obtainable by the aforementioned methods according to the present invention.

A "curable composition" is understood to be a substance or mixture of multiple substances, which is curable by physical or chemical measures. In this regard, these chemical or physical measures can be, for example, the supplying of energy in the form of heat, light, or other electromagnetic radiation, but also simply bringing into contact with atmospheric moisture, water, or a reactive component. The composition thereby changes from an original state to a state that has a higher hardness.

In preferred embodiments, the composition also contains at least one compound which has a hydrolysable silicon-containing group and a weight average molecular weight in the range of 100 to 1000 g/mol measured by GPC according to DIN 55672-1:2007-08. This compound is used as a crosslinking agent, and in addition to the hydrolysable silicon-containing group may contain further functional groups. The compound may be a silane coupling agent.

This type of coupling agent may be used as a tackifier, as an agent which influences the physical properties, as a drying agent, as a dispersion aid, or as a filler or the like. In particular, such a silane coupling agent can act as an adhesion promoter and increase the adhesion to various surfaces, for example glass, aluminum, stainless steel, zinc, copper, mortar, PVC, acrylic resins, polyester, polyethylene, polypropylene, and polycarbonate. Such a silane coupling agent may include reactive silicon-containing groups which may be defined analogously to the groups described above in conjunction with polymer component a). Alternatively, the groups may also be those of formula (IV):

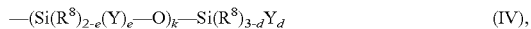

$$—(Si(R^8)_{2-e}(Y)_e—O)_k—Si(R^8)_{3-d}Y_d \quad (IV),$$

where $R^8$ is selected from a hydrocarbon residue containing 1 to 20 carbon atoms or a triorganosiloxane group of formula —O—$Si(R^9)_3$, where each $R^9$ is independently selected from a hydrocarbon residue containing 1 to 20 carbon atoms; each Y is independently selected from a hydroxy group or a hydrolysable group, preferably an oxime group or alkoxy group; and k is 0, 1, or 2; e is 0, 1, or 2 and d is 0, 1, 2, or 3, where d and e are both not 0, and k is 0 or an integer from 1 to 19, where d is not 0 when k is 0.

Compound of formula (IV) may contain further functional groups, including but not limited to primary, secondary, or tertiary amino groups, mercapto groups, epoxy groups, carboxyl groups, vinyl groups, isocyanate groups, isocyanurate groups, halogens, and the like.

Specific examples of these coupling agents include but are not limited to silanes containing isocyanate groups, such as gamma-isocyanate propyltrimethoxysilane, gamma-isocyanate propyltriethoxysilane, gamma-Isocyanate propylmethyldiethoxysilane, gamma-isocyanate propylmethyldimethoxysilane, (isocyanate methyl)trimethoxysilane, (isocyanate methyl)methyldimethoxysilane, (isocyanate methyl)triethoxysilane, and (isocyanate methyl)diethoxymethylsilane; silanes containing amino groups, such as gamma-aminopropyltrimethoxysilane, gamma-aminopropyltriethoxysilane, gam ma-aminopropyltriisopropoxysilane, gamma-aminopropylmethyldimethoxysilane, gamma-aminopropylmethyldiethoxysilane, gamma-(2-aminoethyl)aminopropyltrimethoxysilane, gamma-(2-aminoethyl)aminopropylmethyldimethoxysilane, gamma-(2-aminoethyl) aminopropyltriethoxysilane, gamma-(2-aminoethyl) aminopropylmethyldiethoxysilane, gamma-(2-aminoethyl) aminopropyltriisopropoxysilane, gamma-(6-aminohexyl) aminopropyltrimethoxysilane, 3-(N-ethylamino)-2-methylpropyltrimethoxysilane, gamma-ureidopropyltrimethoxysilane, gamma-ureidopropyltriethoxysilane, N-phenyl-gamma-aminopropyltrimethoxysilane, N-benzyl-gamma-aminopropyltrimethoxysilane, N-vinylbenzyl-gamma-aminopropyltriethoxysilane, N-cyclohexylaminomethyltriethoxysilane, N-cyclohexylaminomethyldiethoxymethylsilane, N-phenylaminomethyltrimethoxysilane, (2-aminoethyl)aminomethyltrimethoxysilane, and N,N'-bis[3-(trimethoxysilyl)propyl]ethylenediamine;
silanes of the ketimine type, such as N-(1,3-dimethylbutylidene)-3-(triethoxysilyl)-1-propanamine; silanes containing mercapto groups, such as gamma-mercaptopropyltrimethoxysilane, gamma-mercaptopropyltriethoxysilane, gamma-mercaptopropylmethyldimethoxysilane, gamma-mercaptopropylmethyldiethoxysilane, mercaptomethyltrimethoxysilane, and mercaptomethyltriethoxysilane; silanes containing epoxy groups, such as gamma-glycidoxypropyltrimethoxysilane, gamma-glycidoxypropyltriethoxysilane, gamma-glycidoxypropylmethyldimethoxysilane, beta-(3,4-epoxycyclohexyl)ethyltrimethoxysilane, and beta-(3,4-epoxycyclohexyl)ethyltriethoxysilane; carboxysilanes, such as beta-carboxyethyltriethoxysilane, beta-carboxyethylphenyl-bis(2-methoxyethoxy)silane, and N-beta-(carboxymethyl) aminoethyl-gamma-aminopropyltrimethoxysilane; silanes containing unsaturated groups of the vinyl type, such as vinyltrimethoxysilane, vinyltriethoxysilane, gamma-methacryloyloxypropylmethyldimethoxysilane, gamma-acryloyloxypropyltriethoxysilane, and methacryloyloxymethyltrimethoxysilane; silanes containing halogen, such as gamma-chloropropyltrimethoxysilane; and isocyanurate silanes, such as tris(3-trimethoxysilylpropyl)isocyanurate. In addition, partially condensed products or reaction products of the above-mentioned silanes may be used. Aminosilanes selected from the group consisting of bis(trimethylsilyl)amine, aminopropyltriethoxysilane, aminopropyltrimethoxysilane, bis[(3-triethoxysilyl)propyl]amine, bis[(3-trimethoxysilyl)propyl]amine, aminopropylmethyldiethoxysilane, aminoethylaminopropyltrimethoxysilane, aminoethylaminopropyltriethoxysilane, 3-[2-(2-aminoethylamino) ethylamino]propyltrimethoxysilane, phenylaminomethyltrimethoxysilane, aminoethylaminopropylmethyldimethoxysilane, 3-(N-phenylamino)propyltrimethoxysilane, 3-piperazinylpropylmethyldimethoxysilane, 3-(N,N-dimethylaminopropyl)aminopropylmethyldimethoxysilane, and combinations of two or more of the above-mentioned compounds are particularly preferred within the scope of the present invention.

Examples of compounds of formula (IV) which contain no additional functional groups include tetraalkoxysilanes (tetraalkylsilicates), such as tetramethoxysilane, tetraethoxysilane, ethoxytrimethoxysilane, dimethoxydiethoxysilane, methoxytriethoxysilane, tetra-n-propoxysilane, tetra-isopropoxysilane, tetra-n-butoxysilane, tetra-isobutoxysilane, and tetra-t-butoxysilane; trialkoxysilanes, such as methyltrimethoxysilane, methyltriethoxysilane, methyltriisopropoxysilane, methyltriphenoxysilane, ethyltrimethoxysilane, butyltrimethoxysilane, and phenyltrimethoxysilane; dialkoxysilanes, such as dimethyldimethoxysilane, diethyldimethoxysilane, and diphenyldimethoxysilane; monoalkoxysilanes, such as trimethylmethoxysilane and triphenylmethoxysilane; alkylisopropenoxysilanes, such as dimethyldiisopropenoxysilane and methyltriisopropenoxysilane; and the partially hydrolyzed condensates of these silanes.

The curable composition can also contain, in addition to the aforementioned silylated polyurethane according to the present invention, adjuvants and additives, such as catalysts, plasticizers, stabilizers, antioxidants, fillers, reactive diluents, drying agents, adhesion promoters and UV stabilizers, fungicides, flame retardants, rheological adjuvants, color pigments or color pastes, and so on.

A "plasticizer" is understood as a substance that decreases the viscosity of the compositions and thus facilitates processability. Hydrophilic plasticizers serve to improve moisture uptake and thus to improve reactivity at low temperatures. Suitable as plasticizers are, for example, adipic acid esters, azelaic acid esters, benzoic acid esters, butyric acid esters, acetic acid esters; esters of higher fatty acids having approximately 8 to approximately 44 carbon atoms, esters of OH-group-carrying or epoxidized fatty acids, fatty acid esters and fats, glycolic acid esters, phosphoric acid esters, phthalic acid esters of linear or branched alcohols containing 1 to 12 carbon atoms, propionic acid esters, sebacic acid esters, sulfonic acid esters, thiobutyric acid esters, trimellitic acid esters, citric acid esters, and esters based on nitrocellulose and polyvinyl acetate, as well as mixtures of two or more thereof. The asymmetrical esters of adipic acid monooctyl ester with 2-ethylhexanol (Edenol DOA, Cognis Deutschland GmbH, Dusseldorf) are particularly suitable.

Plasticizers can be additionally used in the composition at between 0 and 40 wt. %, by preference between 0 and 20 wt. %, based on the total weight of the composition.

"Stabilizers" for purposes of this invention are to be understood as antioxidants, UV stabilizers, or hydrolysis stabilizers. Examples thereof are the commercially usual sterically hindered phenols and/or thioethers and/or substituted benzotriazoles and/or amines of the hindered amine light stabilizer (HALS) type. It is preferred in the context of the present invention if a UV stabilizer that carries a silyl group, and that is incorporated into the end product upon crosslinking or curing, is used. The products Lowilite 75, Lowilite 77 (Great Lakes, USA) are particularly suitable for this purpose. Benzotriazoles, benzophenones, benzoates, cyanoacrylates, acrylates, sterically hindered phenols, phosphorus, and/or sulfur can also be added.

The composition according to the present invention can contain up to 2 wt. %, by preference 1 wt. % of stabilizers, based on the total weight of the composition. In addition, the composition according to the present invention can further contain up to 7 wt. %, in particular up to 5 wt. % of antioxidants, based on the total weight of the composition.

"Flame retardant" is understood as a compound that inhibit or delay the spread of fire on the material by reducing the flammability of the organic material. Commonly used flame retardant substances are metal hydroxides, metal oxides, organic acids esters etc.

The catalysts that can be used are all known compounds that can catalyze hydrolytic cleavage of the hydrolysable groups of the silane groupings, as well as subsequent condensation of the Si—OH group to yield siloxane groupings (crosslinking reaction and adhesion promotion function). Examples thereof are titanates such as tetrabutyl titanate and tetrapropyl titanate, tin carboxylates such as dibutyltin dilaurate (DBTL), dibutyltin diacetate, dibutyltin diethylhexanoate, dibutyltin dioctoate, dibutyltin dimethylmaleate, dibutyltin diethylmaleate, dibutyltin dibutylmaleate, dibutyltin diiosooctylmaleate, dibutyltin ditridecylmaleate, dibutyltin dibenzylmaleate, dibutyltin maleate, dibutyltin diacetate, tin octaoate, dioctyltin distearate, dioctyltin dilaurate (DOTL), dioctyltin diethylmaleate, dioctyltin diisooctylmaleate, dioctyltin diacetate, and tin naphthenoate; tin alkoxides such as dibutyltin dimethoxide, dibutyltin diphenoxide, and dibutyltin diisoproxide; tin oxides such as dibutyltin oxide and dioctyltin oxide; reaction products between dibutyltin oxides and phthalic acid esters, dibutyltin bisacetylacetonate; organoaluminum compounds such as aluminum trisacetylacetonate, aluminum trisethylacetoacetate, and diisopropoxyaluminum ethylacetoacetate; chelate compounds such as zirconium tetraacetylacetonate and titanium tetraacetylacetonate; lead octanoate; amine compounds or salts thereof with carboxylic acids, such as butylamine, octylamine, laurylamine, dibutylamines, monoethanolamines, diethanolamines, triethanolamine, diethylenetriamine, triethylenetetramine, oleylamines, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole, und 1,8-diazabicyclo-(5,4,0)-undecene-7 (DBU), a low-molecular-weight polyamide resin obtained from an excess of a polyamine and a polybasic acid, adducts of a polyamine in excess with an epoxy, silane adhesion promoters having amino groups, such as 3-aminopropyltrimethoxysilane and N-(β-aminoethyl)aminopropylmethyldimethoxysilane.

The catalyst, preferably mixtures of several catalysts, can be used in a quantity from 0.01 to 5 wt. %, more preferably 0.03 to 1 wt. %, based on the entire weight of the composition.

The composition according to the invention may additionally contain fillers. Suitable examples here are chalk, lime powder, precipitated and/or pyrogenic silicic acid, zeolites, bentonites, magnesium carbonate, diatomaceous earth, alumina, clay, talc, titanium oxide, iron oxide, zinc oxide, sand, quartz, flint, mica, glass powder, and other ground mineral substances. In addition, organic fillers may also be used, in particular carbon black, graphite, wood fiber, wood flour, sawdust, cellulose, cotton, pulp, wood chips, chopped straw, and chaff. Moreover, short fibers such as glass fiber, glass filament, polyacrylonitrile, carbon fiber, Kevlar fiber, or also polyethylene fiber may be added. Powdered aluminum is likewise suitable as filler.

The pyrogenic and/or precipitated silicic acids advantageously have a BET surface area of 10 to 90 $m^2/g$. During use, they do not cause an additional increase in the viscosity of the composition according to the invention, but contribute to strengthening of the cured composition.

It is likewise conceivable to use pyrogenic and/or precipitated silicic acids having a larger BET surface area, advantageously 100-250 $m^2/g$, in particular 110-170 $m^2/g$, as filler. Due to the larger BET surface area, the same effect, for example strengthening the cured composition, may be obtained at a lower weight fraction. Further substances may thus be used to improve the composition according to the invention with regard to other requirements.

Furthermore, hollow spheres having a mineral shell or a plastic shell are suitable as filler. These may be, for example, hollow glass spheres which are commercially available under the trade name Glass Bubbles®. Hollow spheres based on plastic, for example Expancel® or Dualite®, are described in EP 0520426 B1, for example. These are composed of inorganic or organic substances, each having a diameter of 1 mm or less, preferably 500 μm or less.

For some applications, fillers are preferred which impart thixotropy to the compositions. Such fillers are also described as rheological aids, for example hydrogenated castor oil, fatty acid amides, or swellable plastics such as PVC. To allow them to be easily pressed out of a suitable dosing device (a tube, for example), such compositions have a viscosity of 3000 to 15,000 mPa·s, preferably 40,000 to 80,000 mPa·s, or also 50,000 to 60,000 mPa·s.

The fillers are preferably used in a quantity of 1 to 80% by weight, based on the total weight of the composition.

Examples of suitable pigments are titanium dioxide, iron dioxides, or carbon black.

Surfactant may be used according to the present invention such as leveling agents, degassing agents, or defoaming agents.

Biologically active substances such as fungicides are may also be added to the polymer composition according to the present invention. These substances inhibit the growth of microorganisms on the surface or in the matrix of cured polymer composition.

In order to enhance shelf life even further, it is often advisable to further stabilize the composition according to the present invention with respect to moisture penetration using drying agents. A need occasionally also exists to lower the viscosity of the adhesive or sealant according to the present invention for specific applications, by using a reactive diluent. All compounds that are miscible with the adhesive or sealant with a reduction in viscosity, and that possess at least one group that is reactive with the binder, can be used as reactive diluents.

The following substances can be used, for example, as reactive diluents: polyalkylene glycols reacted with isocyanatosilanes (e.g. Synalox 100-50B, Dow), carbamatopropyltrimethoxysilane, alkyltrimethoxysilane, alkyltriethoxysilane, methyltrimethoxysilane, methyltriethoxysilane, and vinyltrimethoxysilane (VTMO Geniosil XL 10, Wacker), vinyltriethoxysilane, phenyltrimethoxysilane, phenyltriethoxysilane, octyltrimethoxysilane, tetraethoxysilane, vinyldimethoxymethylsilane (XL12, Wacker), vinyltriethoxysilane (GF56, Wacker), vinyltriacetoxysilane (GF62, Wacker), isooctyltrimethoxysilane (10 Trimethoxy), isooctyltriethoxysilane (10 Triethoxy, Wacker), N-trimethoxysilylmethyl-O-methyl carbamate (XL63, Wacker), N-dimethoxy(methyl)silylmethyl-O-methyl carbamate (XL65, Wacker), hexadecyltrimethoxysilane, 3-octanoylthio-1-propyltriethoxysilane, and partial hydrolysates of the aforementioned compounds.

Also usable as reactive diluents are the following polymers of Kaneka Corp.: MS S203H, MS S303H, MS SAT 010, and MS SAX 350.

Silane-modified polymers that are derived, for example, from the reaction of isocyanatosilane with Synalox grades can likewise be used.

In the same manner, the silylated polyurethanes according to the present invention can be used in a mixture with usual polymers or prepolymers known per se, optionally with concurrent use of the aforementioned reactive diluents, fillers, and further adjuvants and additives. "Usual polymers or prepolymers" can be selected in this context from polyesters, polyoxyalkylenes, polyacrylates, polymethacrylates, or mixtures thereof; these can be free of groups reactive with siloxane groups, but optionally can also comprise alkoxysilyl groups or hydroxyl groups.

A plurality of the aforementioned silane-functional reactive diluents have at the same time a drying and/or adhesion-promoting effect in the composition. These reactive diluents may be used in quantities between 0.1 and 15 wt. %, by preference between 1 and 5 wt. %, based on the total weight of the composition.

Also suitable as adhesion promoters, however, are so-called tackifying agents, such as hydrocarbon resins, phenol resins, terpene-phenolic resins, resorcinol resins or derivatives thereof, modified or unmodified resin acids or resin esters (abietic acid derivatives), polyamines, polyaminoamides, anhydrides, and anhydride-containing copolymers. The addition of polyepoxide resins in small quantities can also improve adhesion on many substrates. The solid epoxy resins having a molecular weight of over 700, in finely ground form, are then preferably used for this. If tackifying agents are used as adhesion promoters, their nature and quantity depend on the adhesive/sealant composition and on the substrate onto which it is applied. Typical tackifying resins (tackifiers) such as, for example, terpene-phenolic resins or resin acid derivatives, may be used in concentrations between 5 and 20 wt. %; typical adhesion promoters such as polyamines, polyaminoamides, or phenolic resins or resorcinol derivatives may be used in the range between 0.1 and 10 wt. %, based on the total weight of the composition.

Unless explicitly stated otherwise, all percent values provided in conjunction with the compositions described herein refer to % by weight, in each case based on the mixture in question.

The curable composition according to the invention is produced according to known methods by intimately mixing the components in suitable dispersion units, for example a high-speed mixer.

The present invention also provides the use of the curable composition comprising the silylated polyurethane according to the present invention as adhesives, sealants, spray foam and/or coatings. A further field of application of the curable compositions according to the present invention is use as plugging, hole-filling, or spackling compound.

The compositions according to the invention are thus suitable for adhesively bonding plastics, metals, glass, ceramic, wood, wood-based materials, paper, paper-based materials, rubber, and textiles, for gluing floors, sealing building elements, windows, wall and floor coverings, and jointing in general. In this regard, the materials in each case may be adhesively bonded to themselves or with any other of the stated materials.

In principle in the present invention, all features listed within the context of the present text, particularly the embodiments, proportional ranges, components and other features of the composition according to the invention, of the method according to the invention and of the use according to the invention identified as preferred and/or special, can be implemented in all possible and not mutually exclusive combinations, with combinations of features identified as preferred and/or special also being regarded as preferred and/or special.

The following examples are used to explain the invention; however, the invention is not limited thereto.

EXAMPLES

Examples 1 and 2: 140 g (12.5 mmol) of polypropylene glycol of approximate molecular weight 12 000 g/mol (OH no.=10 mg KOH/g) was poured in a 250 ml three neck flask and dried under vacuum at 80° C. for 1 h. After the vacuum was released and replaced with argon, 0.19 g (0.25 mmol) of DOTL catalyst and 5.83 g (26.3 mmol) of isophorone diisocyanate (IPDI) was added and the reaction mixture was stirred for 1 hour at the same temperature. In the second step 26.3 mmol of hydroxyl functional silanes listed in the Table 1 was added and kept stirring at 80° C. for 3 hours. After the described procedure the sample was collected and analyzed in IR spectrometer. No bands for NCO groups were observed, meaning that all of the NCO groups were reacted.

Comparative Example 1

The procedure described in Examples 1 and 2 was repeated. In the second step 26.3 mmol of (3-aminopropyl)trimethoxysilane was added instead of the hydroxyl functional silane. After the described procedure the sample was collected and analyzed in IR spectrometer. No bands for NCO groups were observed, meaning that all of the NCO groups were reacted.

Examples 3 and 4: 140 g (12.5 mmol) of polypropylene glycol of approximate molecular weight 12 000 g/mol (OH no.=10 mg KOH/g) was poured in a 250 ml three neck flask and dried under vacuum at 80° C. for 1 h. After the vacuum was released and replaced with argon, 0.19 g (0.25 mmol) of DOTL catalyst and 26.3 mmol of hydroxyl functional silane listed in the Table 1 were added and homogenously mixed. Afterwards 5.83 g (26.3 mmol) of isophorone diisocyanate (IPDI) was added and the reaction mixture was stirred for 3 hours at the same temperature. After the described procedure the sample was collected and analyzed in IR spectrometer.

No bands for NCO groups were observed, meaning that all of the NCO groups were reacted.

Comparative Example 2

The procedure described in Examples 3 and 4 was repeated. In the first step 26.3 mmol of (3-aminopropyl) trimethoxysilane was added instead of the hydroxyl functional silane. Highly viscous turbid liquid was formed, which is not suitable for further application as a sealant or adhesive. After the described procedure the sample was collected and analyzed in IR spectrometer. No bands for NCO groups were observed, meaning that all of the NCO groups were reacted.

The viscosity of the obtained prepolymers after the end-capping was measured at 25° C. by Anton Paar MCR 302 Rheometer in neat conditions using PP25/TG stirring plate.

TABLE 1

Viscosity of the prepolymers prepared according to the Examples 1 to 4 and Comparative Examples 1 and 2

|  | End-capper | Viscosity (Pas) |
| --- | --- | --- |
| Example 1 | 4-hydroxy-4-methyl-N-(3-(trimethoxysilyl)propyl)decanamide | 164 |
| Example 2 | 4-hydroxy-4-methyl-N-(3-(trimethoxysilyl)propyl)-7-decenamide | 189 |
| Comp. Example 1 | (3-aminopropyl) trimethoxysilane | 624 |
| Example 3 | 4-hydroxy-4-methyl-N-(3-(trimethoxysilyl)propyl)decanamide | 287 |
| Example 4 | 4-hydroxy-4-methyl-N-(3-(trimethoxysilyl)propyl)-7-decenamide | 271 |
| Comp. Example 2 | (3-aminopropyl) trimethoxysilane | 1183 |

The invention claimed is:

1. A silylated polyurethane obtained by reacting:
   a) at least one polyol having a number average molecular weight of from 1000 to 50,000 g/mol;
   b) at least one polyisocyanate; and
   c) at least one tertiary hydroxyl functional alkoxysilane of the general formula (I)

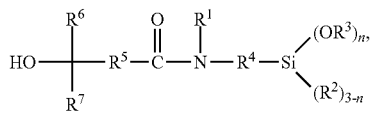

wherein
   $R^1$ is selected from the group consisting of hydrogen and a linear or branched, substituted or unsubstituted, hydrocarbon residue having 1 to 20 carbon atoms;
   $R^2$ and $R^3$ are, independent from one another, selected from a linear or branched, substituted or unsubstituted, hydrocarbon residue having 1 to 20 carbon atoms;
   $R^4$ is selected from a linear or branched, substituted or unsubstituted, hydrocarbon residue having 1 to 20 carbon atoms;
   $R^5$ is selected from a linear or branched, substituted or unsubstituted, hydrocarbon residue having 1 to 20 carbon atoms;
   $R^6$ and $R^7$ are, independent from one another, selected from a linear or branched, substituted or unsubstituted, hydrocarbon residue having 1 to 20 carbon atoms;
   n is 1, 2 or 3; and
   wherein the tertiary hydroxyl functional alkoxysilane of the general formula (I) is obtained by reacting at least one di-substituted lactone compound and at least one aminosilane having at least one primary or secondary amino group.

2. The silylated polyurethane according to claim 1, wherein at least one compound that is monofunctional to isocyanates, selected from the group consisting of monoalcohols, monomercaptans, monoamines, and mixtures thereof, and/or monoisocyanate is added in the reacting of the silylated polyurethane.

3. The silylated polyurethane according to claim 1, wherein the polyol is a polyether polyol.

4. The silylated polyurethane according to claim 1, wherein $R^1$ is selected from hydrogen or a $C_1$-$C_8$ alkyl residue.

5. The silylated polyurethane according to claim 1, wherein $R^2$ and $R^3$ are independent from one another selected from a linear or branched, substituted or unsubstituted, $C_1$-$C_{20}$ alkyl or $C_6$-$C_{18}$ aryl residue; and n is 2 or 3, 3.

6. The silylated polyurethane according to claim 1, wherein $R^4$ and $R^5$ are independent from one another selected from a linear or branched, substituted or unsubstituted, $C_1$-$C_{20}$ alkylene.

7. The silylated polyurethane according to claim 1, wherein $R^6$ and $R^7$ are independent from one another selected from a linear or branched, substituted or unsubstituted $C_1$-$C_{20}$ alkyl, $C_1$-$C_{20}$ alkenyl, $C_1$-$C_{20}$ alkynyl, or $C_6$-$C_{18}$ aryl residue.

8. The silylated polyurethane according to claim 1, wherein the di-substituted lactone has the general formula (II)

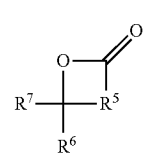

and
   the aminosilane has the general formula (III)

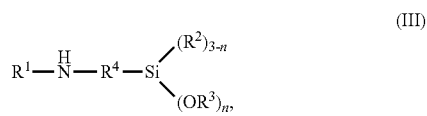

wherein the $R^1$ to $R^7$ and n are the same as defined above for the general formula (I).

9. The silylated polyurethane according to claim 1, wherein the silylated polyurethane is obtained by:
   (a) reacting the at least one polyol having a number average molecular weight of from 1000 to 50,000 g/mol with the at least one polyisocyanate, at a stoichiometric excess of the NCO group of the polyisocyanate(s) with respect to the OH group of the polyol(s) to form a NCO-terminated polyurethane prepolymer; and (b) reacting said NCO-terminated polyurethane prepolymer with the at least one tertiary hydroxyl functional alkoxysilane of the general formula (I).

10. The silylated polyurethane according to claim 1, wherein the silylated polyurethane is obtained by:

(a) mixing the at least one polyol having a number average molecular weight of from 1000 to 50,000 g/mol and the at least one tertiary hydroxyl functional alkoxysilane of the general formula (I), at a stoichiometric excess of the OH group of the tertiary hydroxyl functional alkoxysilane(s) of the general formula (I) with respect to the OH group of the polyol(s); and (b) reacting the mixture obtained in step (a) with at least one polyisocyanate, at a stoichiometric excess of the NCO group of the polyisocyanate(s) with respect to the OH group of the polyol(s) and the tertiary hydroxyl functional alkoxysilane(s) of the general formula (I).

11. A method for preparing a silylated polyurethane, comprising:

providing (a) at least one polyol having a number average molecular weight of from 1000 to 50,000 g/mol;

providing (b) at least one polyisocyanate, diisocyanate; and providing (c) at least one tertiary hydroxyl functional alkoxysilane of the general formula (I)

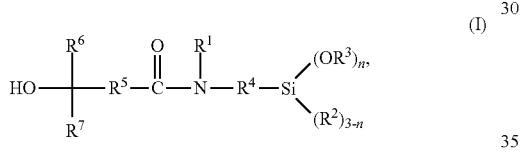

(I)

wherein $R^1$ is selected from the group consisting of hydrogen and a linear or branched, substituted or unsubstituted hydrocarbon residue having 1 to 20 carbon atoms;

$R^2$ and $R^3$ are same or different and are, independent from one another, selected from a linear or branched, substituted or unsubstituted hydrocarbon residue having 1 to 20 carbon atoms;

$R^4$ is selected from a linear or branched, substituted or unsubstituted hydrocarbon residue having 1 to 20 carbon atoms;

$R^5$ is selected from a linear or branched, substituted or unsubstituted hydrocarbon residue having 1 to 20 carbon atoms;

$R^6$ and $R^7$ are same or different and are, independent from one another, selected from a linear or branched, substituted or unsubstituted hydrocarbon residue having 1 to 20 carbon atoms; and n is 1, 2 or 3;

wherein the tertiary hydroxyl functional alkoxysilane of the general formula (I) is obtained by reacting at least one di-substituted lactone compound and at least one aminosilane having at least one primary or secondary amino group; and reacting the (a) at least one polyol having a number average molecular weight of from 1000 to 50,000 g/mol; and (b) the at least one polyisocyanate; and (c) the at least one tertiary hydroxyl functional alkoxysilane of the general formula (I).

12. A curable composition comprising the silylated polyurethane according to claim 1.

13. An adhesive, sealant, spray foam and/or coating comprising the silylated polyurethane according to claim 1.

* * * * *

UNITED STATES PATENT AND TRADEMARK OFFICE
CERTIFICATE OF CORRECTION

PATENT NO. : 11,560,445 B2
APPLICATION NO. : 16/894290
DATED : January 24, 2023
INVENTOR(S) : Jan-Erik Damke et al.

It is certified that error appears in the above-identified patent and that said Letters Patent is hereby corrected as shown below:

In the Specification

Column 8, Line 8 change "Pa-s" to --Pa•s--.
Column 8, Line 8 change "Pa-s" to --Pa•s--.
Column 8, Line 9 change "Pa-s" to --Pa•s--.
Column 15, Line 36 change "gam ma-aminopropyltriisopropoxysilane" to --gamma-aminopropyltriisopropoxysilane--.
Column 19, Line 13 change "(10 Trimethoxy)" to --(IO Trimethoxy)--.
Column 19, Line 14 change "(10 Triethoxy, Wacker)" to --(IO Triethoxy, Wacker)--.

Signed and Sealed this
Sixteenth Day of April, 2024

Katherine Kelly Vidal
*Director of the United States Patent and Trademark Office*